United States Patent [19]

Birke et al.

[11] 4,194,880
[45] Mar. 25, 1980

[54] PROCESS FOR THE DYEING OR PRINTING OF POLYESTER FIBERS

[75] Inventors: Walter Birke; Hans-Ulrich von der Eltz; Franz Schön, all of Frankfurt am Main, Fed. Rep. of Germany

[73] Assignee: Hoechst Aktiengesellschaft, Frankfurt am Main, Fed. Rep. of Germany

[21] Appl. No.: 903,004

[22] Filed: May 4, 1978

[30] Foreign Application Priority Data

May 7, 1977 [DE] Fed. Rep. of Germany ....... 2720660

[51] Int. Cl.² .......................... C09B 27/00; D06P 1/02
[52] U.S. Cl. ....................................... 8/41 B; 8/41 C; 8/94 A; 8/178 R; 8/179
[58] Field of Search ............. 8/41 C, 94 A, 179, 41 B, 8/178 R

[56] References Cited

U.S. PATENT DOCUMENTS

| 2,072,252 | 3/1937 | Ellis | 8/50 |
| 3,725,384 | 4/1973 | Zickendraht | 8/50 |
| 3,988,109 | 10/1976 | Schuierer | 8/94 R |
| 4,113,428 | 9/1978 | Hugl et al. | 8/41 C |
| 4,121,899 | 10/1978 | Chambers et al. | 8/94 A |

FOREIGN PATENT DOCUMENTS 1040501 10/1958 Fed. Rep. of Germany .
2262713 10/1975 France .
792210 3/1958 United Kingdom .

OTHER PUBLICATIONS

Venkataraman, "The Chemistry of Synthetic Dyes," vol. III, (Academic Press.), 1970, p. 385.
Colour Index (Third Edition), 1971, vol. 4, pp. 4226-4227, C. I. 26070; C. I. 26080; C. I. 26090.

*Primary Examiner*—A. Lionel Clingman
*Attorney, Agent, or Firm*—Curtis, Morris & Safford

[57] ABSTRACT

In the process for the pad-dyeing or printing of materials consisting of, or containing, polyester or polyamide fibers or filaments, in which process the materials are padded or printed in common manner with aqueous baths or printing pastes of disperse dyestuffs, and the dyestuffs are subsequently fixed by the action of liquid or gaseous methylene chloride or both of the said phases of methylene chloride, the improvement that use is made of a dyestuff of the formula

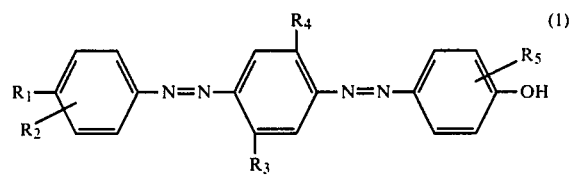

in which $R_1$ stands for hydrogen, hydroxy, nitro or

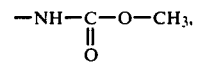

$R_2$ and $R_3$ each stand for hydrogen, chlorine or alkyl from 1 to 3 carbon atoms or an alkoxy group of from 1 to 3 carbon atoms, $R_4$ represents hydrogen, chlorine, alkyl from 1 to 3 carbon atoms, an alkoxy group from 1 to 3 carbon atoms or —CH=CH—CH=CH— forming the naphthalene ring, and $R_5$ stands for hydrogen, alkyl from 1 to 3 carbon atoms or alkoxy from 1 to 3 carbon atoms, which dyestuffs have a solubility in methylene chloride of at least 2 g/l.

2 Claims, No Drawings

PROCESS FOR THE DYEING OR PRINTING OF POLYESTER FIBERS

The present invention relates to a process for the dyeing or printing of polyester fibers.

From German Auslegeschrift No. 2,433,662 a process for the dyeing and finishing of textile goods has already been known, according to which a solution or dispersion of a dyestuff or chemical agent appropriate for application is applied onto the textile goods which are subsequently subjected to the action of air enriched with a halogenated hydrocarbon having a temperature of about 30° C. at a maximum, for the purpose of dyestuff fixation. This process comprises applying the dyestuff and/or chemical agent in an aqueous solution or dispersion onto the textile goods and then exposing the latter to an air current which has been enriched with methylene chloride.

From German Patent Specification No. 1,040,501 a process for the dyeing of textile goods of synthetic fibers has been known, according to which the textile goods are passed first through an aqueous solution of the dyestuff and are then heated in order to eliminate water. Subsequently, the textile goods are exposed to the saturated vapor of methylene chloride for the fixation of the dyestuff, in which process the methylene chloride is condensed.

Furthermore, a process for the pad-dyeing or printing of materials consisting of, or containing, polyester or polyamide fibers or filaments has been proposed, in which process aqueous baths and/or printing pastes of disperse dyestuffs are applied in common manner onto the materials, and the dyestuffs are then fixed by a treatment with methylene chloride. This process comprises bringing the padded or printed and optionally dried material into a close contact with an accompanying material containing methylene chloride, or bonding said material on one side with an accompanying material which is then moistened with methylene chloride, and thereafter allowing the material to dwell in either case at a temperature of up to 41° C.

According to another process proposed, in which aqueous baths and/or printing pastes of disperse dyestuffs are also applied in common manner onto materials of polyester or polyamide fibers or filaments, the fixation of the dyestuffs is effected by applying methylene chloride in a liquid form onto the padded or printed and optionally dried material by way of spraying, sprinkling, foaming, padding, or by means of rollers or brushes.

All these known or proposed processes show as common process step the dyestuff fixation in the presence of methylene chloride (or probably by the methylene chloride), wherein the methylene chloride is present in a liquid and/or gaseous phase.

It has now been found that materials which consist of, or contain, polyester or polyamide fibers or filaments can be pad-dyed or printed, in which process the materials are padded and/or printed in common manner with aqueous baths and/or printing pastes of disperse dyestuffs, and subsequently the dyestuffs are fixed by the action of liquid and/or gaseous methylene chloride, by using dyestuffs of the general formula

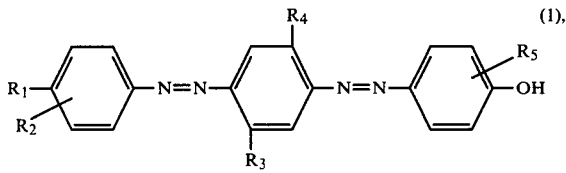

in which $R_1$ stands for a hydrogen atom or the hydroxy, nitro or $$-NH-\underset{\underset{O}{\|}}{C}-O-CH_3- \text{ group,}$$

$R_2$, $R_3$ and $R_4$ each stand for a hydrogen or chlorine atom or an alkyl group having from 1 to 3 carbon atoms or an alkoxy group of from 1 to 3 carbon atoms, and $R_4$ may besides represent the radical $-CH=CH-CH=CH$ required for the formation of the naphthalene ring, and $R_5$ stands for a hydrogen atom or an alkyl group of from 1 to 3 carbon atoms or an alkoxy group of from 1 to 3 carbon atoms, which dyestuffs have a solubility of at least 2 g/l.

For the dyeing processes comprising the dyestuff fixation on polyester fibers in the presence of methylene chloride, the experiences made through processes for the dyeing of polyester of the common kind are not applicable in any manner. Thus, for example, only an insufficient dyestuff yield is reached in particular with the dyestuff of the formula

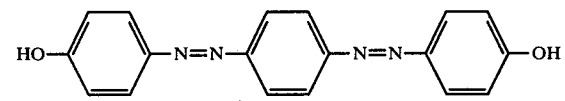

(solubility of this dyestuff in methylene chloride 0.5 g/l), but also with the dyestuff of the formula

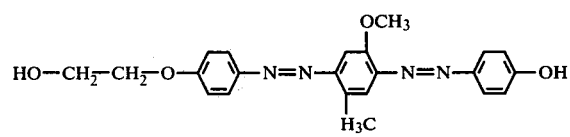

although very good dyestuff yields are obtained with these dyestuffs according to the conventional methods (i.e. without fixation in the presence of methylene chloride).

Of the dyestuffs used according to the process of the invention, those mentioned below are particularly suitable (the number shown in each case behind the formula represents the solubility of the dyestuff in methylene chloride in g/l):

1. 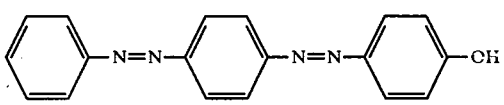 [8.9]

2. 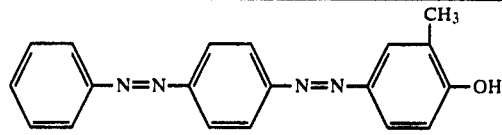 [5.4]

3. 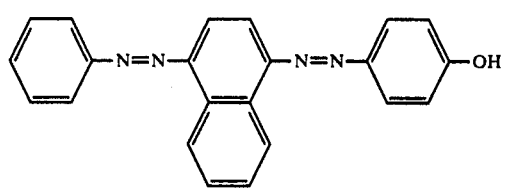 [2.3]

4. 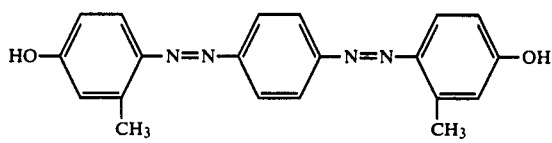 [2.6]

5. 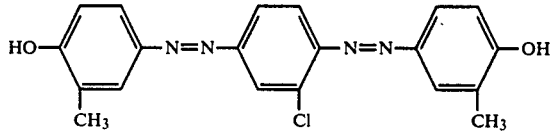 [4.7]

6. 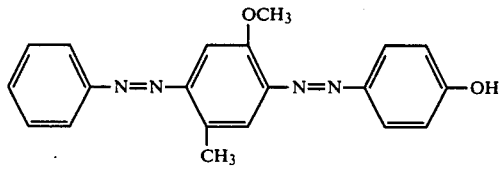 [18.4]

7. 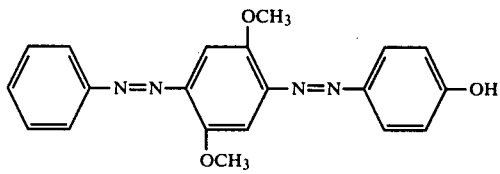 [16.5]

8. 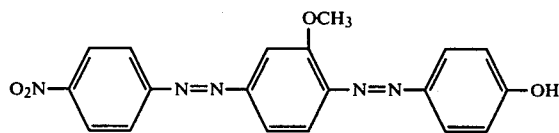 [27.6]

9. 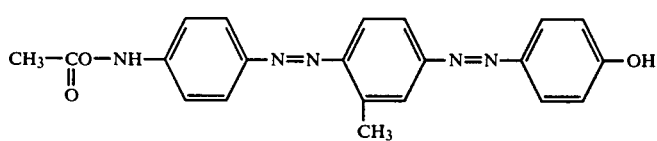 [4.6]

Method of determining the solubility of the disperse dyestuffs in methylene chloride:

10 Milligrams of disperse dyestuff in a form used in commerce are dispersed in 1 liter of distilled water. 10 Milliliters of this dyestuff dispersion are drawn off and are made up to 100 ml with dimethylformamide. Furthermore, a solution of the same disperse dyestuff of about 2 g in 100 ml of methylene chloride is prepared by stirring for 30 minutes at room temperature, in which process undissolved dyestuff or extender portions are filtered off or allowed to deposit. 5 Milliliters are drawn off from the clear dyestuff solution and are made up to 100 ml with dimethylformamide. The two dyestuff solutions are then measured by way of spectrophotometry in known manner. Finally the value for the solubility is also calculated in known manner.

The following Examples serve to illustrate the invention.

EXAMPLE 1

A fabric of texturized polyester fibers is padded on a padder at room temperature with a liquor pick-up of 90% with an aqueous bath which contains per liter 20 g of the dyestuff of the formula

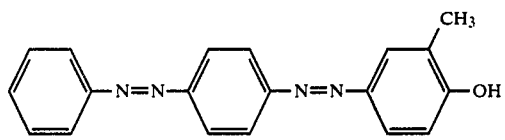

and 1 g of a commercial wetting agent.

Subsequently, the padded fabric is passed for 1 minute through a chamber filled with methylene chloride vapor. After the condensation of the methylene chloride has been completed, the material is wound up. Thereafter, the material is allowed to dwell for 3 hours in a closed container or in a sheet which is not permeable for methylene chloride and is then subjected to an after-treatment in common manner.

The yellow dyeing obtained shows the fastness properties which are characteristic of the dyestuff used.

EXAMPLE 2

A fabric of texturized polyester fibers is padded on a padder at room temperature with a liquor pick-up of 90% with an aqueous bath which contains per liter 20 g of the dyestuff of the formula

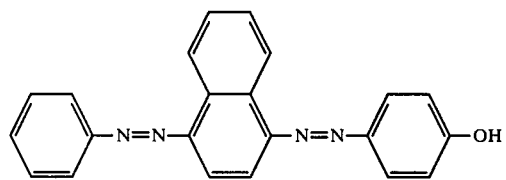

and 1 g of a commercial wetting agent.

At the same time a cotton fabric is padded with methylene chloride. Both fabrics are wound up together. Subsequently, they are allowed to dwell for Lb 3 hours at room temperature.

Following an after-treatment common for polyester fibers, an orange dyeing is obtained which shows the fastness properties characteristic of the dyestuff used.

EXAMPLE 3

A mixed fabric of polyester fibers and cotton (67:33) is impregnated on a padder with a liquor pick-up of about 65% with an aqueous bath which contains per liter 20 g of the dyestuff of the formula

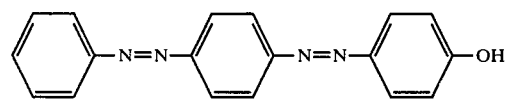

and 20 g of the dyestuff of the formula

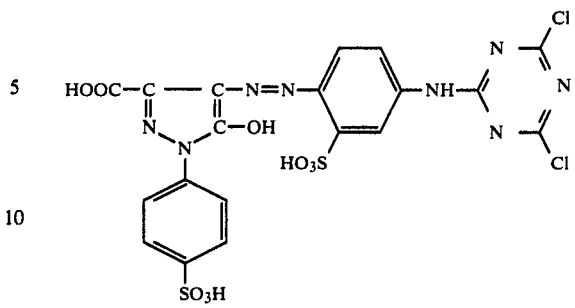

and 2 g of a commercial wetting agent as well as 20 g of calcined sodium carbonate.

After the padded wet fabric has been wound up together with a glass fiber fabric moist with methylene chloride, the material is allowed to dwell for 6 hours. Upon completing the dyeing by rinsing with hot water and soaping at the boil with 1 g/l of a non-ionogenic detergent as well as by rinsing and drying, a golden yellow dyeing is obtained on both fiber portions.

EXAMPLE 4

A textile material of texturized polyester filaments is impregnated with an aqueous dyestuff liquor which contains 20 g/l of the dyestuff of the formula

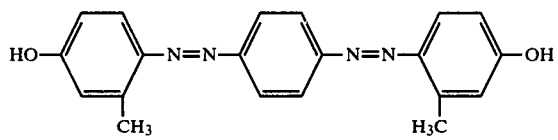

The impregnated material is wound up on a perforated cylinder. Thereafter air enriched with methylene chloride is passed through the material roll. Following a treatment period of 4 hours at room temperature, the material is treated with water vapor. Finally the dyeing is completed as usual by rinsing and drying.

A golden orange dyeing is obtained which has good fastness properties.

EXAMPLE 5

A knitted fabric of texturized polyester fibers is padded on a padder at room temperature with a liquor pick-up of 90% with an aqueous bath which contains per liter 20 g of the dyestuff of the formula

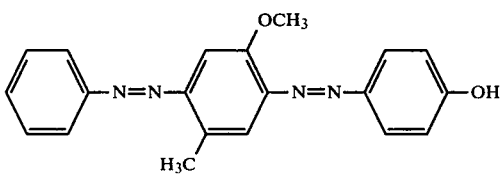

and 1 g of a commercial wetting agent.

Simultaneously a cotton fabric is padded with methylene chloride. The knitted fabric and the cotton fabric are then wound up together, while being separated from each other by polyethylene sheets. Subsequently, the goods are allowed to dwell for 3 hours at room temperature. Following a reductive alkaline after-treatment which is common for polyester fibers an orange dyeing is obtained which shows the fastness properties that are characteristic of the dyestuff used.

If instead of the above-mentioned dyestuff use is made of the following disperse dyestuffs under the same conditions, the latter are fixed on the polyester fibers while yielding the color shades shown. The dyeings obtained are marked by the fastness properties that are characteristic of the dyestuffs used.

| Dyestuff | Color shade on polyester fibers |
|---|---|
| ![structure] with OCH3, H3CO groups, two N=N, ending OH | orange |
| O2N-...-N=N-...(OCH3)...-N=N-...-OH | orange |
| H3C-CO-NH-...-N=N-...(H3C)...-N=N-...-OH | orange |
| ...-N=N-...-N=N-...-OH | golden yellow |

EXAMPLE 6

A fabric of polyester staple fibers is printed with a printing paste which contains per kilogram the following components:

15 g of the golden yellow dyestuff of the formula

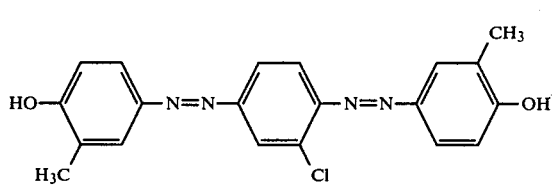

911 g of water, 50 g of a sodium alginate, 16 g of a starch ether, 6.7 g of a water softening agent on the basis of polyphosphate, and 1.3 g of citric acid. In order to fix the dyestuff, the printed goods are then processed according to the method described in FIG. 3, optionally with a subsequent reductive purification.

A print is obtained which shows the fastness properties that are characteristic of the dyestuff used.

EXAMPLE 7

The process is carried out according to the method described in Example 1, however, with the difference that a car safety belt of polyester filaments of high tenacity is padded and allowed to dwell, following the winding-up, for 3 hours in the dwelling chamber at a temperature of from 40° to 41° C., while being turned.

An even yellow dyeing is obtained with an excellent penetration of the dyestuff.

Besides, a shrinkage of about 20% is obtained, which corresponds to the common values reached in thermal processes (as in a one-minute treatment with hot air at a temperature in the range of from 200° to 210° C.).

EXAMPLE 8

A cross-wound bobbin (600 g) of polyester staple fiber yarn is impregnated on a laboratory dyeing apparatus with a bath which contains per liter of water 20 g the dyestuff of the formula

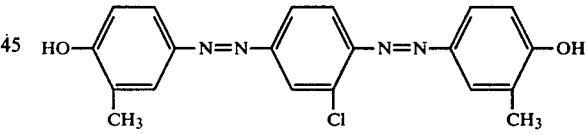

and 2 g of a commercial wetting agent.

Subsequently, the cross-wound bobbin is centrifuged, until it contains a residual amount of water of 20%. The material thus impregnated is placed onto a perforated material carrier. The dyestuff fixation is effected by passing air enriched with methylene chloride for 3 hours at room temperature through the cross-wound bobbin. The orange dyeing obtained is completed by a common alkaline reductive after-treatment.

A bobbin is obtained which shows an unobjectionable penetration of the dyestuff. The dyeing shows the fastness properties which are characteristic of the dyestuff used.

We claim:

1. In the process for the pad-dyeing or printing of materials consisting of, or containing, polyester or polyamide fibers or filaments, in which process the materials are padded or printed in common manner with aqueous baths or printing pastes of disperse dyestuffs, and the dyestuffs are subsequently fixed by the action of liquid or gaseous methylene chloride or both of the said phases of methylene chloride, the improvement that use is made of a dyestuff of the formula

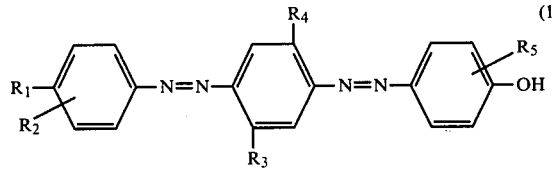

in which $R_1$ stands for hydrogen, hydroxy, nitro or

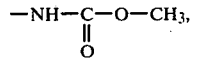

$R_2$ and $R_3$ each stand for hydrogen, chlorine or alkyl from 1 to 3 carbon atoms or an alkoxy group of from 1 to 3 carbon atoms, $R_4$ represents hydrogen, chlorine, alkyl from 1 to 3 carbon atoms, an alkoxy group from 1 to 3 carbon atoms or —CH=CH—CH=CH— forming the naphthalene ring, and $R_5$ stands for hydrogen, alkyl from 1 to 3 carbon atoms or alkoxy from 1 to 3 carbon atoms, which dyestuffs have a solubility in methylene chloride of at least 2 g/l.

2. Process as claimed in claim 1, wherein the solubility of the dyestuffs of the general formula indicated in methylene chloride is at least 5 g/l.

* * * * *